United States Patent [19]

Weber

[11] Patent Number: 4,939,817
[45] Date of Patent: Jul. 10, 1990

[54] PROCESS AND DEVICE FOR SEPARATING A SULFUR-LYE SUSPENSION

[75] Inventor: Guenter Weber, Linden, Fed. Rep. of Germany

[73] Assignee: Linde Aktiengesellschaft, Wiesbaden, Fed. Rep. of Germany

[21] Appl. No.: 66,598

[22] Filed: Jun. 26, 1987

[30] Foreign Application Priority Data

Jun. 26, 1986 [DE] Fed. Rep. of Germany ....... 3621481

[51] Int. Cl.$^5$ .............................................. C01D 3/20
[52] U.S. Cl. .................................. 23/308 S; 210/773; 210/535; 210/513; 210/532.1
[58] Field of Search ............ 210/773, 535, 513, 532.1; 23/308 S

[56] References Cited

U.S. PATENT DOCUMENTS

| 1,438,048 | 12/1922 | Marsh | 210/535 |
| 2,625,268 | 1/1953 | Hatfield | 210/532.1 |
| 2,762,511 | 9/1956 | Sternaman | 210/532.1 |
| 2,883,060 | 4/1959 | Griffith | 210/532.1 |
| 4,304,570 | 12/1981 | Kleeberg et al. | 23/308 S |
| 4,519,907 | 5/1985 | Rooney | 210/532.1 |

OTHER PUBLICATIONS

Perry et al, *Chemical Engineer's Handbook*, McGraw-Hill, New York, 5th ed., 1973, pp. 21-11, 12.

Primary Examiner—Mark L. Bell
Assistant Examiner—David M. Brunsman
Attorney, Agent, or Firm—Millen, White & Zelano

[57] ABSTRACT

For separating sulfur from a sulfur-lye suspension, the suspension is fed into a flooded separation tank, a temperature above the melting temperature of sulfur is maintained in the separation tank, and liquid sulfur and lye are withdrawn from the separation tank. To reduce the formation of sodium thiosulfate, the area of the interfacial separation layer between liquid sulfur and lye is maintained as small as possible in separation tank (15) by providing that the liquid sulfur be fed into a relatively small diameter vertical separation pipe (4), in which the separation layer (6) between liquid sulfur and lye is established, and the liquid sulfur is drained out through separation pipe (4). (FIG. 1)

22 Claims, 2 Drawing Sheets

PROCESS AND DEVICE FOR SEPARATING A SULFUR-LYE SUSPENSION

CROSS REFERENCE TO RELATED APPLICATION

This invention is related to commonly owned application Ser. No. 881,766, filed July 3, 1986.

BACKGROUND OF THE INVENTION

This invention relates to a process and apparatus for separating liquid, especially for separating sulfur from a sulfur-lye suspension, in which the sulfur-lye suspension is fed into a separation tank. The temperature inside the separation tank is maintained above the melting temperature of sulfur so that liquid sulfur lye can be separated by gravity and then withdrawn from the separation tank. (By "lye" it is intended to define any alkaline solution, particularly a sodium carbonate solution.)

By the use of the technique of oxidative scrubbing of hydrogen sulfide from a flue gas, hydrogen sulfide is removed and immediately oxidized to elementary sulfur. An aqueous alkaline solution, containing essentially sodium carbonate, vanadium salts, and organically bonded nitrogen, is usually used as a regenerable scrubbing liquid (e.g., DE-OS 32 39 602).

Several reactions generally occur in the scrubbing step. The absorbed hydrogen sulfide dissociates in the alkaline solution into HS− ions forming NaHS. This sodium hydrogen sulfide is completely oxidized by vanadate V ion into elementary sulfur, which is suspended in the scrubbing liquid in the form of fine solid particles. Simultaneously, the vanadium is reduced from oxidatively active valence V to oxidatively inactive IV.

The resultant scrubbing liquid made inactive through $H_2S$ oxidation is aerated with air in an oxidizing vessel to reconvert the vanadium to valence V. In aerating the scrubbing liquid, the suspended elementary sulfur becomes concentrated at the liquid surface as sulfur foam and is drained into the collecting tank through an overflow weir. The oxidized lye is passed into a surge tank to be later treated for sulfur removal so that sulfur-free solution can be recycled to the flue gas scrubbing step.

The initial separation of sulfur from the scrubbing liquid is conducted with centrifuges or decanters, producing a sulfur cake with a residual moisture of 60 to 70% by weight. For complete sulfur-lye separation, the sulfur is melted and decanted from the scrubbing liquid. During this last step, the undesirable by-product sodium thiosulfate $Na_2S_2O_3$ is formed. Its rate of formation should be kept as low as possible.

SUMMARY OF THE INVENTION

An object of this invention is to provide a process and associated apparatus for separating liquids.

Another object is to provide a separation process for the separation of molten sulfur from a lye-containing scrubbing liquid so as to reduce the formation of $Na_2S_2O_3$, all other conditions being equal.

Upon further study of the specification and appended claims, further objects and advantages of this invention will become apparent to those skilled in the art.

At the outset, without being bound by an explanation of this invention, it is assumed that the first step in the formation of $Na_2S_2O_3$ is the formation of $Na_2S$, i.e., a reaction between liquid sulfur and scrubbing liquid. This reaction involves heterogeneous two-phase contact which in turn is dependent on the size surface area of the phase boundary, i.e., of the interface layer between liquid sulfur and lye, available for the reaction. Thus, to attain the objects of this invention, the size of the interface layer should be minimized to the extent possible, bearing in mind practical considerations.

More specifically, the objects of the invention are attained by operating the separation tank in a flooded condition, passing liquid sulfur into a vertical separation pipe in which an interfacial separation layer between liquid sulfur and lye is established, and withdrawing the liquid sulfur from the separation pipe.

According to one aspect of the invention, the separated liquid sulfur is maintained not as conventionally in the separation tank, but rather in a separate vertical separation pipe which contains the interface between liquid sulfur and lye. The separation pipe in this case has a cross sectional area substantially smaller than the usual boundary between liquid sulfur and lye of a normally horizontal separation tank, so that a substantially smaller surface layer between liquid sulfur and lye results, thereby resulting in a reduction in the formation of sodium thiosulfate. Less sodium thiosulfate in turn extends the service life of the scrubbing liquid and lowers the operating costs for the oxidative hydrogen sulfide scrubbing step.

The apparatus for carrying out the process comprises a separation tank provided with a feed for the sulfur-lye suspension, a withdrawal pipe for the lye and discharge means for the liquid sulfur. According to the invention, the apparatus comprises a vertical separation pipe, which is attached to the discharge means for the liquid sulfur, said separation pipe being connected to an outlet pipe for the liquid sulfur. To facilitate sulfur removal, the discharge means for liquid sulfur is connected directly into the separation pipe, from which the sulfur is then finally drained off. Heating devices are generally located both in the separation tank and the sulfur chamber in order to keep the temperature above the melting temperature of sulfur.

To fulfill the requirement of minimizing the area of the separation layer between liquid sulfur and lye, the separation pipe appropriately exhibits a diameter which is at most 50%, preferably to 20% of the diameter of the separation tank. For example, when the dimensions of the tank are approximately 1 m in diameter and 4 m in length, the separation layer between liquid sulfur and lye usually amounts to 4 $m^2$. However, the boundary layer in a separation pipe 0.4 m in diameter amounts to only 0.12 $m^2$. This means that the separation layer which affects $Na_2S_2O_3$ formation is reduced by a factor of 33. This calculation is based on a horizontal separation tank, as is found in normal use and which is operated in a flooded condition and did not contain any segregation units.

The insertion of a slanted separation plate, particularly at an inclination of 15 to 30° relative to the horizontal, has proven to be advantageous with this type of separation tank. The liquid sulfur can flow rapidly over the sloping plate into the separation pipe in which the boundary between liquid sulfur and lye is located.

The same effect is also achieved if, instead of a sloping separation plate inserted into a horizontal separation tank, an inclined separation tank, preferably slanted at a 15 to 30° angle relative to the horizontal, is used.

According to another feature of the device according to the invention, baffles are placed in the separation tank. These baffles aid in the separation of the sulfur-lye suspension.

According to another appropriate embodiment, a sulfur chamber is attached to the separation pipe and is connected to the outlet pipe for the liquid sulfur. This sulfur chamber is also preferably equipped with a heater to maintain the temperature of the sulfur above the melting temperature.

As another aspect of the invention, in order to remove impurities which can accumulate around the boundary layer between liquid sulfur and lye, the separation pipe advantageously has a discharge pipe attached to it by which impurities can be drained off as needed.

The process and apparatus according to the invention are suited for sulfur separation from any lye and it is readily apparent that the apparatus will be useful for other separations as well.

BRIEF DESCRIPTION OF THE DRAWINGS

Various other objects, features and attendant advantages of the present invention will be more fully appreciated as the same becomes better understood when considered in connection with the accompanying drawings, in which like reference characters designate the same or similar parts, and wherein the figures are preferred embodiments, schematically representing in FIG. 1 a tank having a slanted separation plate and in FIG. 2 an inclined tank.

DETAILED DESCRIPTION OF THE DRAWINGS

Figure 1:
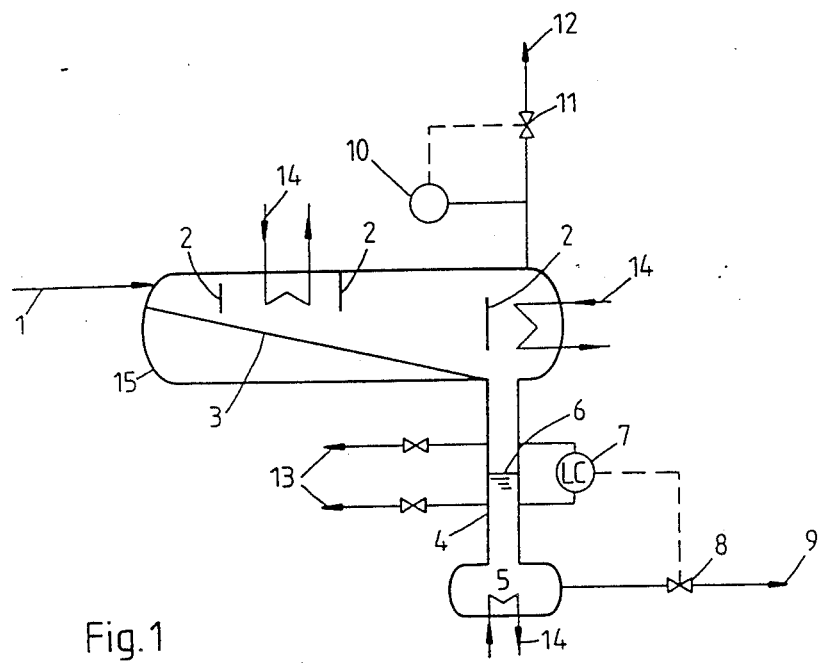

According to FIG. 1, a liquid sulfur-lye suspension at a temperature of 130° C. enters separation tank 15 through pipe 1. In the separation tank, the suspension is separated by decantation into a lye fraction and a liquid sulfur fraction. This separation is aided by vertically attached baffles 2.

The liquid sulfur quickly flows along slanted separation plate 3 into vertical separation pipe 4, in which boundary layer 6 between liquid sulfur and lye is located.

The separation pipe empties into sulfur chamber 5. Through level controller 7 and liquid sulfur outlet valve 8, with an amount of sulfur being released pipe 9 attached to sulfur chamber 5, at a rate permitting the separation layer to remain in the range allowed by the level controller.

At the top of the separation tank, the sulfur-free lye is continually removed through pipe 12 via outlet valve 11 provided with pressure control means 10. This removal is conducted at the end of the tank opposite the entry point of the suspension, so that the separation tank is constantly flooded without a gas/steam cushion.

Impurities which collect around the boundary layer can be drained off, as needed, through pipe 13. The temperature in the separation tank is adjusted with steam heaters 14.

Figure 2:
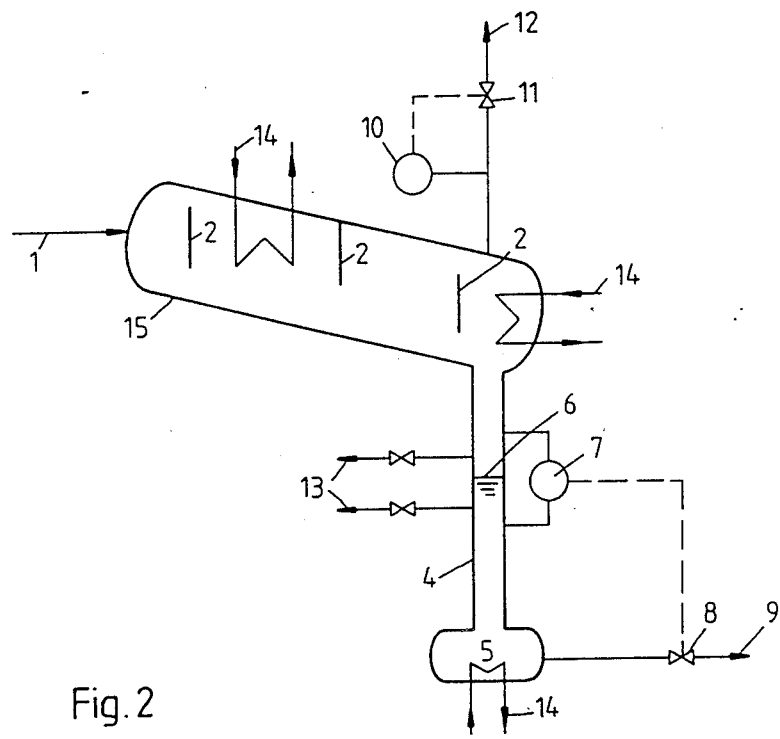

The separation tank according to FIG. 2 corresponds essentially to that in FIG. 1; however, there is no slanted plane inserted into the separation tank, Instead, the entire separation tank according to FIG. 2 is inclined. In general, the angle of the largest dimension of the tank relative to the horizontal is not more than about 45°. The reason for this is that otherwise the residence time for the heavies fraction - the liquid sulfur - to separate from the lighter fraction - the lye - would be too short.

Without further elaboration, it is believed that one skilled in the art can, using the preceding description; utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

Again according to FIG. 1, a cylindrical horizontal separating tank 15 is supplied, via pipe 1, with about 5,000 kg/h of a sulfur/alkaline solution suspension at a temperature of about 130° C. and under a pressure of about 3.0 bar.

The dimensions of the tank are approximately 1 m in diameter and 4 m in length assuming a residence time of approximately 20 minutes. In the separation tank, the Suspension is separated by decantation into a lye fraction and a liquid sulfur fraction. This separation is aided by vertically attached baffles 2.

The liquid sulfur, which is the heavy fraction and has the higher density, quickly flows along slanted separation plate 3 into vertical separation pipe 4, in which boundary layer 6 between liquid sulfur and lye is located.

The separation pipe empties into sulfur chamber 5, from which liquid sulfur is being continuously withdrawn in an amount of 1,000 kg/h.

The lighter fraction (alkaline solution) having the lower density, is continually removed at the top of the separation tank through pipe 12 in an amount of 4,000 kg/h. The withdrawn alkaline solution contains less than 1 kg/h of sulfur.

The preceding examples can be repeated with similar success by substituting the generically or specifically described reactants and/or operating conditions of this invention for those used in the preceding examples.

The entire text of all applications, patents and publications, cited in the present document are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for separating sulfur from a sulfur-lye suspension, the sulfur-lye suspension is fed into a separation tank, the temperature inside the separation tank is maintained above the melting temperature of sulfur, and liquid sulfur and lye are separated and withdrawn from the separation tank, the improvement wherein the separation tank is operated in the flooded condition, the liquid sulfur is fed into a vertical separation pipe in which a separation layer between the liquid sulfur and lye is established, and the liquid sulfur is drained out of the separation pipe.

2. A process according to claim 1, wherein the temperature in the separation tank-is. .adjusted through a heater located in the separation tank.

3. Apparatus suitable for separating sulfur from a sulfur-lye suspension comprising a separation tank provided with a feed pipe for the sulfur-lye suspension, and a drain pipe for lye; discharge means for liquid sulfur positioned within said separation tank; a vertical separation pipe (4) in communication with the discharge means for the liquid sulfur, and in further communication with an outlet pipe (9) for liquid sulfur, and level control means for continuously maintaining a separation layer within the vertical separation pipe between the liquid sulfur and lye.

4. Apparatus according to claim 3, wherein the diameter oft he separation pipe (4) is at most 50% of the diameter of the separation tank (15).

5. Apparatus according to claim 3, wherein separation tank (15) is a horizontal tank, and said discharge means comprises a slanted separation plate (3) within said tank.

6. Apparatus according to claim 5, wherein the separation plate (3) is inclined at 15 to 30°.

7. Apparatus according to claim 3, wherein the separation tank is arranged at a 15 to 30° angle relative to the horizontal.

8. Apparatus according to claim 3 further comprising baffles (2) located in the separation tank (15).

9. Apparatus according to claim 3, further comprising a sulfur chamber (5) attached between separation pipe (4), and an outlet pipe (9) for the liquid sulfur.

10. Apparatus according to claim 9, said sulfur chamber (5) being provided with heater means (14).

11. Apparatus according to claim 3, further comprising impurity discharge pipe means (13), branched from said separation pipe (4).

12. Apparatus according to claim 5, wherein the diameter of separation pipe (4) is at most 50% of the diameter of separation tank (15).

13. Apparatus according to claim 6, wherein the diameter of separation pipe (4) is at most 50% of the diameter of separation tank (15).

14. Apparatus according to claim 7, wherein the diameter of separation pipe (4) is at most 50% of the diameter of separation tank (15).

15. Apparatus according to claim 6, further comprising a sulfur chamber (5) attached between separation pipe (4), and an outlet pipe (9) for the liquid sulfur.

16. Apparatus according to claim 7, further comprising a sulfur chamber (5) attached between separation pipe (4), and an outlet pipe (9) for the liquid sulfur.

17. Apparatus according to claim 4 further comprising impurity discharge pipe means (13), branched from said separation pipe (4).

18. Apparatus according to claim 7 further comprising impurity discharge pipe means (13), branched from said separation pipe (4).

19. Apparatus according to claim 9 further comprising impurity discharge pipe means (13), branched from said separation pipe (4).

20. A process according to claim 1, wherein the diameter of the separation pipe is at most 50% of the diameter of the separation tank.

21. A process according to claim 1, wherein the separation tank is provided with an inclined surface of 15–30° angle to the horizontal to effect separation of the liquid sulfur and lye within the tank.

22. A process according to claim 1, wherein the process is continuous and the separation layer is maintained continuously within the vertical separation pipe.

* * * * *